Patented Feb. 28, 1950

2,499,243

UNITED STATES PATENT OFFICE 2,499,243

METHOD OF PRESERVING EDIBLE LIQUIDS

Alberto Franklin, Caracas, Venezuela

Application September 19, 1945, Serial No. 617,328

1 Claim. (Cl. 99—155)

It is a primary object of this invention to provide a process for the preservation of foods in liquid form, which process will be effective without the use of refrigeration or any of the usual chemical preservatives.

It is a further object of this invention to provide a method by which bacterial action in liquid foods may be inhibited without recourse either to chemical or (in most cases) thermal methods.

It is a further object of this invention to preserve foods in liquid form without chemical or other change during the period of treatment or preservation.

Figure 1:
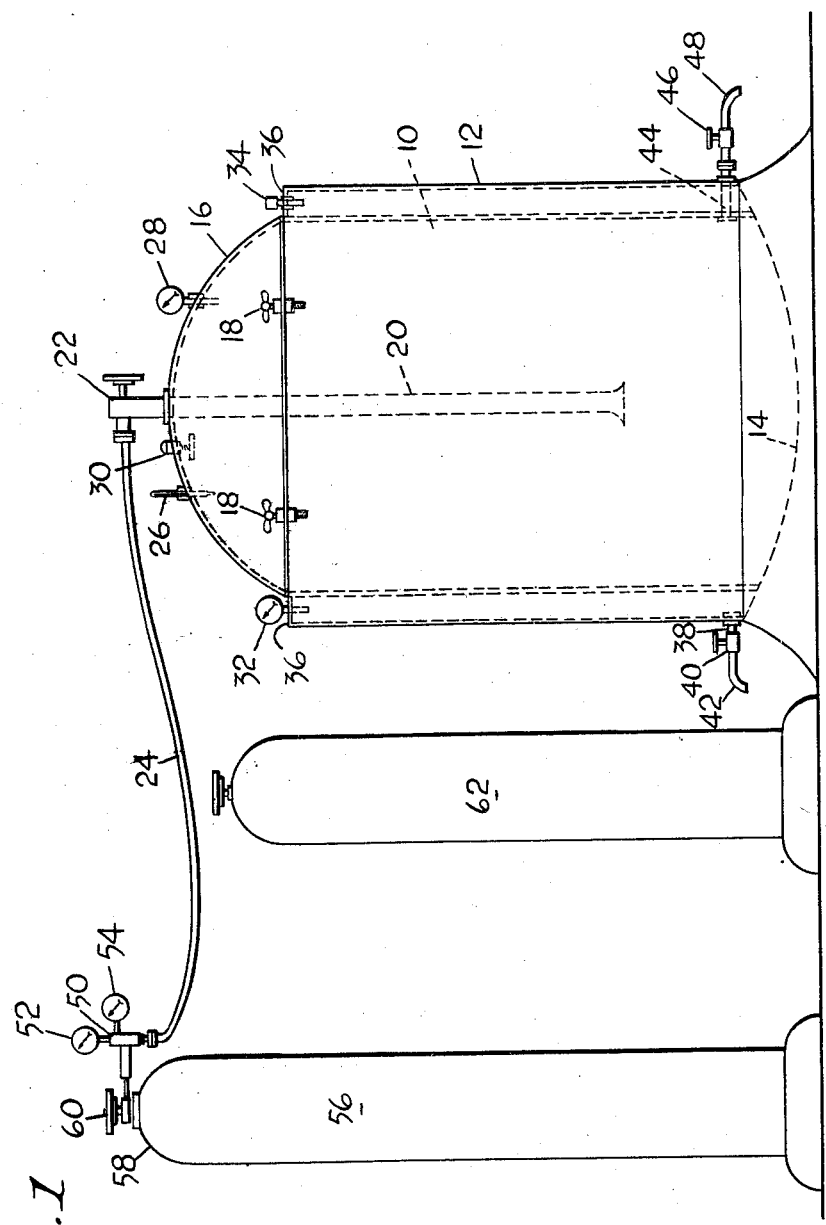
Figure 2:
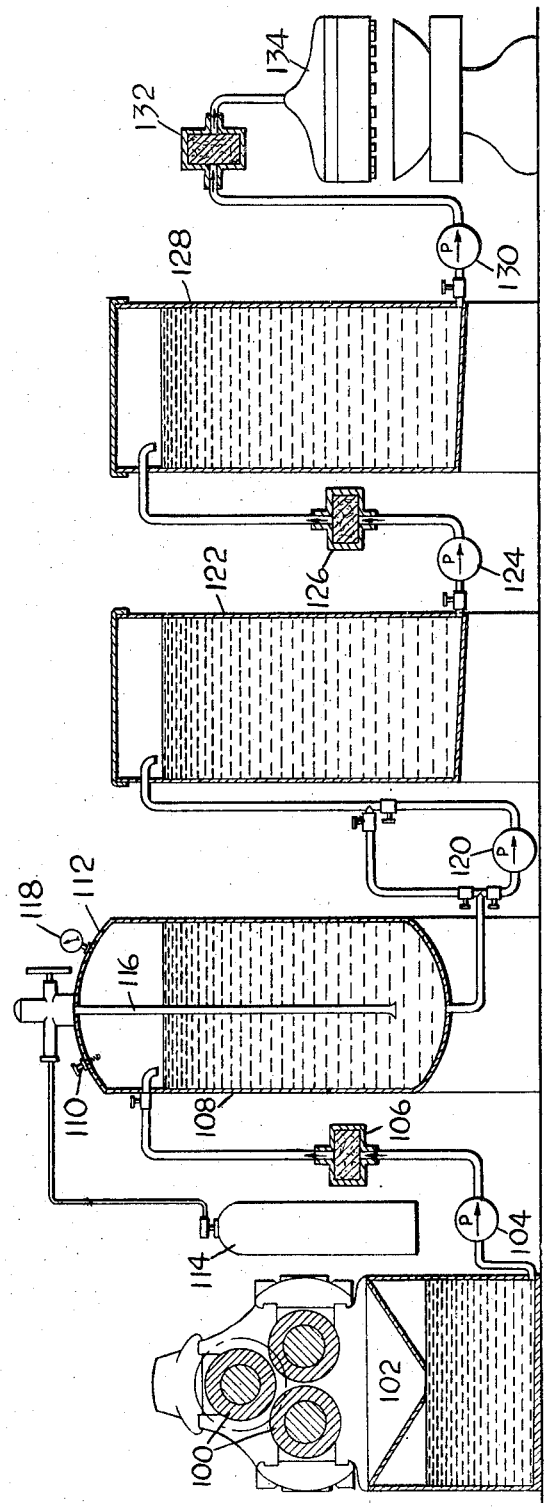

The above and other objects will be made clear from the following detailed description taken in connection with the annexed drawings in which:

Figure 1 is a schematic diagram of an apparatus for the treatment of milk for short term preservation or for the long term preservation of fruit and vegetable juices; and Figure 2 is a similar diagram of an apparatus for the treatment of cane juice.

Any treatment which will inhibit or retard the action of bacteria will act, to a degree, as a food preservative. For example, freezing retards such action. Pasteurization, on the other hand, by destroying large relative numbers of bacteria, similarly acts to retard the action, though in a thermal sense it is the opposite of freezing. Boiling is merely an extreme of pasteurization, and, by the use of pressure, may result in the annihilation of all bacteria. Disinfection, or antisepsis will accomplish the same result, but as a method of preserving foods, suffers from the disadvantage that the antiseptic or disinfectant agent may be toxic at worst, or, at best may alter the flavor of the food.

The present invention contemplates a treatment of food in liquid form which will preserve such food for substantial periods without contributing the slightest toxicity, and wholly without chemical alteration of the food, but which, at the same time, will not alter the chemical properties of the food, nor its flavor. While this process is described with particular reference to the treatment of milk, fruit and cane juices and beer, it is applicable to vegetable juices, soups, and, in general, to any food so far in liquid form as to permit a uniform distribution of a preserving medium throughout the mass.

Referring now to Fig. 1, there is shown a tank 10, preferably cylindrical to withstand internal pressure, surrounded by a jacket 12. The tank 10 is closed at one end by a bottom 14, shown as concave, but which may, if desired, be convex, and having at the other end a removable, spheroidal cover 16. The cover 16 is secured to the tank 10 by means of clamping bolts 18, or other suitable means. The center of the cover 16 is penetrated by a processing pipe 20 which extends downwardly adjacent the bottom 14 of the tank 10. The pipe 20 has, at its upper end, a pressure control valve 22 to which is connected a pipe or hose 24.

Also mounted in the cover 16 is a thermometer 26, a pressure guage 28 and a bleeder valve 30. A pressure guage 32 and a steam valve 34 are mounted in the top 36 of the jacket 12. A steam outlet 38 is mounted in the lower portion of the jacket 12 and passes through a valve 40 to an exhaust pipe 42. A drainage pipe 44 penetrates the jacket 12 and enters the tank 10. The drainage pipe 44 connects with a valve 46 which in turn is connected to a drainage outlet 48.

The pressure pipe or hose 24, at the end opposite the valve 22 connects to a regulator valve 50 having the conventional tank and line pressure guages respectively indicated as 52 and 54. The regulator valve 50 is connected to a gas tank 56 having at its head end 58 a conventional shut-off valve 60. In cases, described hereinafter, where treatment with two different gases is desired, a second gas tank 62 is provided. In such cases the regulator valve may be alternately connected to either of the tanks 56 or 62. Obviously a permanent pipe and dual connections may be provided if desired. If this is the case, tank 62 will have its own regulator valve and guages, similar to 50, 52 and 54 and the valve will be connected to a Tee in the line 24, while a shut-off valve may be provided in the line 24 between the Tee and the tank 56.

The apparatus just described is used in the treatment of fresh, whole milk, when it is desired to preserve the milk for a period of six to about ten days, as follows:

Fresh, whole milk (skimmed milk is, obviously, equally usable) is run into the tank 10 while the cover 16 is removed. The tank 10 is, of course, sterilized by the use of steam or other suitable means before the milk is supplied. When the tank 10 is filled approximately to the level of the cover 16, the cover is applied and is secured by means of the bolts 18. The bleeder valve 30 is opened and the valves 22 and 50 are operated to bring about a flow of ordinary molecular oxygen from the tank 56, through the hose 24 and the pipe 20 through the milk in the tank 10. The oxygen bubbles upwardly through the milk and drives before it the air entrapped in the cover 16. The air and oxygen pass through the bleeder valve 30.

When substantially pure oxygen is flowing through the bleeder valve 30, and this may be detected by many conventional and simple tests, the valve 30 is closed and the flow of oxygen through the pipe 20 is continued until the internal pressure within the tank 10 approximates six atmospheres. The valves 22 and 50 are then set merely to maintain this pressure approximately stable for a period of about four hours. Valves 22 and 50 are then closed and the bleeder valve 30 is opened to relieve the internal pressure in the tank 10 until it is equal to about three atmospheres. Under this latter pressure, the milk may be preserved for from six to ten days. It is, of course, possible either to maintain the three atmosphere pressure in the tank 10, or in an auxiliary storage tank, or tanks, or to bottle the milk under that pressure.

The important aspect of the treatment just described is that the molecular oxygen used is only very slightly soluble in the liquid phase of the milk, hence upon ultimate relief to atmospheric pressure, will leave the milk without an analyzable trace of its presence. Moreover, the oxygen being in molecular form has no tendency to combine with any element of the milk, and, therefore, leaves the milk chemically unchanged. The temperature of the milk during the period of storage is immaterial, both storage and the treatment being carried out at room temperatures. As a result, there is no impairment of the chemical, nutritional, flavor or other qualities of the milk, as is the case with pasteurization.

When it is desired to preserve milk for periods substantially longer than ten days, that is, of three months or more, steps additional to those above described should be interpolated. For long term preservation, the valve 50 is first connected to the tank 62, containing carbon dioxide gas (CO₂), and the process of filling the tank 10, securing the cover 16, admitting the gas, and bringing the pressure up to approximately six atmospheres is repeated. The six atmosphere pressure is maintained for approximately four hours. The pressure is then relieved, by means of the bleeder valve 30, back to atmospheric. With the valve 30 open, steam is admitted to the jacket 12 until the temperature of the milk within the tank 10 is raised to approximately 70 degrees centigrade. Both atmospheric pressure and the seventy degree temperature are then maintained for from forty-five minutes to an hour. The result is to drive from the milk substantially all of the CO₂. The valve 50 is then disconnected from the CO₂ tank 62 and connected to the oxygen tank 56. The process previously described for short-term preservation is then repeated, i. e., bringing the internal pressure in tank 10 to six atmospheres with oxygen, maintaining the pressure for approximately four hours, then bleeding to three atmospheres and storing at that pressure. The steam may be cut off when the oxygen treatment begins, since from that point on, temperature is immaterial.

For fruit and vegetable juices the treatment, whether for short or long term preservation, is substantially the same as the above described treatment of the short term preservation of milk. For any particular juice, and for any particular period of storage of such juice, there may be minor variations of time and pressure from those indicated. These, however, are best determined for the particular plant, and no one skilled in the art should experience difficulty in determining the optimum conditions for his particular operation.

When the material to be treated is substantially a true solution as in cane juice, or colloidal as in the case of milk, the treatments above described may be followed rather precisely. In certain fruit juices there are, however, relatively large particles present and in the case of certain vegetable juices the bacterial agents which promote decay are particularly obstinate. When either or both of these conditions are encountered, the combined carbon dioxide and oxygen treatment should be resorted to and the intermediate heat treatment should be increased either by raising the temperature, or increasing the time, or both.

Fig. 2 illustrates particularly the adaptation of this process to the preservation of sugar cane juice. The crush rolls of a conventional sugar mill are indicated at 100. The juice extracted by the rolls 100 flows to a collecting tank 102. Juice is removed from the collecting tank 102 by means of a pump 104 and is passed through a filter 106 thence to a treatment tank 108. Obviously, juice must be permitted to accumulate in the collecting tank 102 until there is a sufficient quantity to fill the treatment tank 108. The tank 108 is then filled relatively quickly by means of the pump 104. A bleeder valve 110 in the top 112 of the tank 108 is then opened and oxygen is supplied from a pressure tank 114 through a treatment pipe 116 in all respects as previously described. When the air has been driven out, the bleeder valve 110 is closed and pressure within the tank 108 is brought to about six atmospheres. The pressure may be read on a conventional gauge 118 and is maintained for a period of about four hours. The bleeder valve 110 is then opened, but in this case relief is back to atmospheric pressure. The treated juice is then removed from the tank 108 by means of a pump 120. The pump 120 supplies the juice to a clarifier 122. A second pump 124 removes the juice from the clarifier 122 and forces it through a filter 126 thence to a second clarifier 128. A pump 130 removes the juice from the second clarifier 128, passes it through an additional filter 132 and into a bottling machine 134.

With the exception of the treatment tank 108, all of the apparatus illustrated in Fig. 2 is conventional and is not here disclosed in detail. When carrying out the method as disclosed in Fig. 2, it will frequently be found that the output of the crush rolls 100 is greater than can be accommodated by a single treatment unit comprising the treatment tank 108 and its associated clarifiers and filters. In such case, a plurality of treatment units may be arranged in parallel to take the output of the crush rolls 100.

While there is disclosed herein certain specific details of time, temperature, and pressure, and certain specific arrangements of parts for carrying out processes, it is not intended to limit this invention to the details of the disclosure, but only as set forth in the sub-joined claim which is to be broadly construed.

I claim:

A process of preserving raw, untreated edible liquids comprising: placing a body of such liquid in a sterile, closed container at atmospheric pressure; injecting carbon dioxide adjacent the bottom of said container; maintaining the pressure substantially at atmospheric until the atmosphere above the liquid in said container is substantially pure carbon dioxide; then injecting additional carbon dioxide to bring the pressure within the container to not substantially less than 6 atmospheres; maintaining said pressure stable for not substantially less than 4 hours; then relieving said pressure to atmospheric while simultaneously heating said liquid to a temperature at which carbon dioxide is substantially insoluble therein at atmospheric pressure; thereupon discontinuing said heating and simultaneously injecting molecular oxygen adjacent the bottom of the container; maintaining the pressure in said container substantially at atmospheric by bleeding from the top of the container until the atmosphere in the container above the liquid is substantially pure oxygen; then injecting additional oxygen to bring the pressure within the container to not substantially less than 6 atmospheres; maintaining said pressure stable for not substantially less than 4 hours; then relieving said pressure to not substantially less than 3 atmospheres and storing said liquid under the latter pressure.

ALBERTO FRANKLIN.

REFERENCES CITED

The following references are of record in the file of this patent:

UNITED STATES PATENTS

| Number | Name | Date |
| --- | --- | --- |
| 994,641 | Hansen | June 6, 1911 |
| 1,017,144 | Gironcoli | Feb. 13, 1912 |
| 1,103,920 | Walker | July 14, 1914 |
| 1,250,079 | Bart | Dec. 11, 1917 |
| 1,270,698 | Coffman | June 25, 1918 |
| 1,305,244 | Bacon | June 3, 1919 |
| 1,649,127 | Rector | Nov. 15, 1927 |
| 1,725,956 | Cleveland | Aug. 27, 1929 |
| 2,361,640 | McKinnis | Oct. 31, 1944 |